US012664627B2

(12) United States Patent
Salini

(10) Patent No.: US 12,664,627 B2
(45) Date of Patent: Jun. 23, 2026

(54) FACE DEFORMATION COMPENSATING METHOD FOR FACE DEPTH IMAGE, IMAGING DEVICE, AND STORAGE MEDIUM

(71) Applicant: Sony Semiconductor Solutions Corporation, Atsugi (JP)

(72) Inventor: Joseph Salini, Shanghai (CN)

(73) Assignee: Sony Semiconductor Solutions Corporation, Atsugi (JP)

( * ) Notice: Subject to any disclaimer, the term of this patent is extended or adjusted under 35 U.S.C. 154(b) by 278 days.

(21) Appl. No.: 18/557,307

(22) PCT Filed: May 24, 2022

(86) PCT No.: PCT/CN2022/094646
§ 371 (c)(1),
(2) Date: Oct. 26, 2023

(87) PCT Pub. No.: WO2022/253043
PCT Pub. Date: Dec. 8, 2022

(65) Prior Publication Data
US 2024/0242318 A1     Jul. 18, 2024

(30) Foreign Application Priority Data
May 31, 2021     (CN) .......................... 202110602233.9

(51) Int. Cl.
*G06T 5/80*          (2024.01)
*G06T 5/50*          (2006.01)
(Continued)

(52) U.S. Cl.
CPC .................. *G06T 5/80* (2024.01); *G06T 5/50* (2013.01); *G06T 7/337* (2017.01); *G06T 7/521* (2017.01);
(Continued)

(58) Field of Classification Search
CPC .. G06T 5/80; G06T 5/50; G06T 7/337; G06T 7/521; G06T 7/55; G06T 7/70;
(Continued)

(56) References Cited

U.S. PATENT DOCUMENTS 9,646,195 B1 *   5/2017  Kim ..................... G06V 40/171
2017/0316598 A1   11/2017  Wang
(Continued)

FOREIGN PATENT DOCUMENTS

CN          109859097 A      6/2019
CN          110222583 A      9/2019
(Continued)

OTHER PUBLICATIONS

Agresti et al., "Deep Learning for Multi-Path Error Removal in ToF Sensors", Part of the Lecture Notes in Computer Science book series, vol. 11131, Jan. 23, 2019, pp. 1-16.
(Continued)

*Primary Examiner* — Iriana Cruz
(74) *Attorney, Agent, or Firm* — XSENSUS LLP

(57) ABSTRACT
The present disclosure relates to a face deformation compensating method for a face depth image, an imaging device and a storage medium. The face deformation compensating method comprising: creating a generic face deformation map, the generic face deformation map including a generic face landmark data; obtaining a user face image; and applying the generic face deformation map to the user face image, which includes: morphing the generic face deformation map using the generic face landmark data and a user face landmark data; and compensating the depth information in the user face image by using the morphed generic face deformation map so as to correct a face deformation of the user face image. According to the present disclosure, a face depth image with better accuracy can be obtained.

16 Claims, 14 Drawing Sheets

(51) Int. Cl.

| | |
|---|---|
| *G06T 7/33* | (2017.01) |
| *G06T 7/521* | (2017.01) |
| *G06T 7/55* | (2017.01) |
| *G06T 7/70* | (2017.01) |
| *G06V 40/16* | (2022.01) |

(52) U.S. Cl.
CPC .................. *G06T 7/55* (2017.01); *G06T 7/70* (2017.01); *G06V 40/171* (2022.01); *G06T 2207/10028* (2013.01); *G06T 2207/20224* (2013.01); *G06T 2207/30201* (2013.01); *G06T 2207/30244* (2013.01)

(58) Field of Classification Search
CPC . G06T 2207/10028; G06T 2207/20224; G06T 2207/30201; G06T 2207/30244; G06T 7/0012; G06T 5/00; G06V 40/171; G06V 20/647; G06V 40/18

See application file for complete search history.

(56) References Cited

U.S. PATENT DOCUMENTS

| | | | |
|---|---|---|---|
| 2019/0164341 A1 * | 5/2019 | Venkataraman | ..... G06V 40/164 |
| 2020/0082155 A1 | 3/2020 | Kalscheur et al. | |

FOREIGN PATENT DOCUMENTS

| | | |
|---|---|---|
| CN | 212160703 U | 12/2020 |
| WO | 2004/007203 A1 | 1/2004 |

OTHER PUBLICATIONS

International Search Report and Written Opinion mailed on Jul. 22, 2022, received for PCT Application PCT/CN2022/094646, filed on May 24, 2022, 08 pages including English Translation.

Blanz Volker et al: "Fitting a Morphable Model to 3D Scans of Faces", 2007 IEEE 11th International Conference on Computer Vision, Jan. 1, 2007 (Jan. 1, 2007), pp. 1-8, XP93189429, DOI: 10.1109/ICCV.2007.4409029.

Buratto Enrico et al: "Deep Learning for Transient Image Reconstruction from ToF Data", Sensors, vol. 21, No. 6, Jan. 1, 2021 (Jan. 1, 2021), p. 1962, XP093083207, CH ISSN: 1424-8220, DOI: 10.3390/s21061962.

* cited by examiner

| Convert point cloud in sample data to mesh | → | Align 6f data with mesh | → | Projected into image, respectively | → | Compute to obtain DDD |

(a)

(b)

(c)

(d)

FACE DEFORMATION COMPENSATING METHOD FOR FACE DEPTH IMAGE, IMAGING DEVICE, AND STORAGE MEDIUM

CROSS-REFERENCE TO RELATED APPLICATIONS

The present application is based on PCT filing PCT/CN2022/094646, filed on May 24, 2022, which claims the benefit of the Chinese Patent Application No. 202110602233.9, filed on May 31, 2021, with the China National Intellectual Property Administration of the People's Republic of China, each of which is incorporated herein by reference in its entirety.

TECHNICAL FIELD

The present disclosure relates to face deformation compensation for face images in the field of computer vision and, more particularly, to a face deformation compensating method for face images, an imaging device, and a storage medium, which may improve a depth precision of the face images.

BACKGROUND ART

Profiling has wide applications in the Internet and other fields, featured mainly by client profile for mining client characteristics, learning about client preferences, and understanding thoroughly the profiled object. Similarly, large machinery may also be profiled like a human to extract features therefrom and render a complete description through profiling. A large volume of monitoring data is generated in the process of production, delivery, and maintenance of large machinery. Although such data may directly reflect the major characteristics of the machinery, the large volume of data alone cannot directly reveal the deep characteristics. Therefore, profiling the machinery may accurately mine and extract the characteristics in all aspects of the machinery and present them comprehensively so that operators may timely access the operation state of the machinery.

Computer vision, as a study on how to enable computers to comprehend the world through their "eyes", is one of the most popular research fields in deep learning. In particular, through the combination of a camera and a computing unit, a machine vision system may replace the human eyes in identifying, tracking, and measuring a target in a certain scene. In the sectors of computer vision, face ID is one of the most important aspects and is most related to computer vision.

In recent years, with the popularity of smart phones and mobile payment, face ID has received more attention. In fact, the earliest research on face ID shall date back to the 1950s. At that time, scientists were studying face profile extraction methods, but limited by the overall technological level, this study had no progress until the 1980s. Since then, breakthroughs have been made in the methodology of face ID by introducing therein neurophysiology, cranial neurology, vision science and other related disciplines, hence face ID has stepped into a new stage of development.

Currently, face ID has many applications in people's daily life, such as unlocking of mobile phones, automatic door-opening, personnel registration, staff attendance record, and face-sweeping payment. For example, people have gotten used to using face ID to unlock mobile phones and make payments, but this technology involves a complex series of technical processes. To put it simply, a camera or other devices replace the human eyes to capture an image, and a computer processes image information so as to detect, extract, and recognize the face landmarks from the image in a manner that is in line with human cognition.

To improve the precision of face detection and recognition, techniques have been proposed for face recognition based on depth images and point cloud information of human faces. Here, an indirect Time-of-Flight (iToF) system may be taken to acquire depth information of a human face. As a indirect measuring scheme of measuring a difference in distance or depth through measurement of a phase shift, i.e., a phase difference between a transmitted wave and a reflected wave, an iToF depth measurement method has been widely used in the art, for example, a four-step phase method for computing the depth information through a four-phase control signal.

SUMMARY

Technical Problem to be Solved

However, where the iToF is taken to acquire the depth information, the precision of the acquired depth data may be subject to several factors. For example, due to the complex solid geometry of a human face, it is possible to cause same emitted beams to reach a receiving sensor through a plurality of different paths, resulting in attenuation and phase shift of the signal. Such Multipath Interference (MPI) may lead to poor precision of the acquired depth image, leading to defects such as vague images. In addition, human skin is not actually an ideal light-reflecting surface, but a surface where Sub-Surface-Scattering (SubSS) is likely to occur, and the SubSS caused by texture properties of human skin also adversely affect the precision of the depth data, therefore, the acquired face image is distorted.

In view of the above, it is desirable to provide a method, an imaging device, and a storage medium capable of compensating for face deformation of a face image acquired by the iTof method, thereby obtaining a face depth image with better precision.

Technical Solution

According to an embodiment of the present disclosure, a face deformation compensating method is provided, the method including: creating a generic face deformation map, the generic face deformation map including a generic face landmark data; obtaining a client face image; and applying the generic face deformation map to the client face image. Applying the generic face deformation map to the client face image includes: morphing the generic face deformation map using the generic face landmark data and a client face landmark data; and compensating a depth information in the client face image by using the morphed generic face deformation map so as to correct a face deformation of the client face image. The generic face deformation map may contain data of depth information differences between sample data of random face samples and GT data.

In the method according to an embodiment of the present disclosure, the generic face deformation map may be created by: obtaining an iToF data of a face sample; extracting a GT data of the face sample; aligning the GT data with the iToF data, to compute a first depth difference image representing a difference on depth information between the GT data and the iToF data; detecting and extracting a sample face landmark data of the face sample; matching the first depth difference image with the sample face landmark data to obtain a second depth difference image, the second depth difference image having the sample face landmark data as marks; obtaining the generic face landmark data; based on the generic face landmark data and using the sample face landmark data marked in the second depth difference image, morphing the second depth difference image to obtain a third depth difference image, as the generic face deformation map, which is matched and marked with the generic face landmark data.

In the method according to an embodiment of the present disclosure, computing the first depth difference image may include: converting point clouds of the iToF data into a mesh; aligning the GT data with the mesh; projecting the aligned GT data and the mesh to obtain a projected image of the GT data and a projected image of the iToF data; and computing the first depth difference image based on the projected images of the GT data and the iToF data.

In the method according to an embodiment of the present disclosure, computing the first depth difference image may include: directly projecting the GT data by using camera intrinsics, to obtain a projected image of the GT data; projecting point clouds of the iToF data to obtain a projected image of the iToF data; and computing the first depth difference image based on the projected images of the GT data and the iToF data.

In the method according to an embodiment of the present disclosure, applying the generic face deformation map may include: detecting and extracting the client face landmark data from the client face image; morphing the generic face deformation map to match the generic face landmark data marked in the generic face deformation map with the detected client face landmark data, so as to obtain a fourth depth difference image; and based on the fourth depth difference image, compensating the depth information of the client face image.

In the method according to an embodiment of the present disclosure, creating the generic face deformation map may further include: obtaining capturing parameters of the iToF data of the face sample; repeating the step of generating the third depth difference image by changing values of the capturing parameters; and constructing the generic face deformation map by using a plurality of the third depth difference images generated with respect to a plurality of groups of values of the capturing parameters. Moreover, applying the generic face deformation map may further include: obtaining the capturing parameter of the client face image, and interpolating the capturing parameter of the client face image into the generic face deformation map, to obtain a fifth depth difference image marked with the generic face landmark data and corresponding to the capturing parameter of the client face image; detecting and extracting the client face landmark data from the client face image; morphing the fifth depth difference image to match the generic face landmark data marked in the fifth difference image with the detected client face landmark data, so as to obtain a sixth depth difference image; and based on the sixth depth difference image, compensating the depth information of the client face image.

In the method according to an embodiment of the present disclosure, the capturing parameters may include an angle between a face gaze direction and a camera, and a distance between the camera and a face.

In the method according to an embodiment of the present disclosure, the angle includes pitch and yaw.

According to another embodiment of the present disclosure, an imaging device is provided, including: an imaging unit configured to capture a client face image; a memory unit, in which a generic face deformation map including a generic face landmark data is stored; and a processing unit configured to: detect and extract client face landmark data from the client face image; morph the generic face deformation map using the generic face landmark data and the client face landmark data; and compensate depth information in the client face image by using the morphed generic face deformation map, so as to correct a face deformation of the client face image.

According to yet another embodiment of the present disclosure, a storage medium is provided and stores a computer-readable program which, when executed on a processor, performs the method described hereinbefore.

Advantageous Effects

According to the present disclosure, in the method herein, a depth deformation map associated with face landmark information is created to correct a depth error generated by an iToF device when capturing a known scene, such as a human face. Such a depth deformation map is created from recorded scenes at different key configurations (e.g., [yaw, pitch, distance]) and then transformed to fit a generic face model. Furthermore, compensation for the depth deformation of any particular face image is achieved by computing a required deformation based on a deformation interpolation at key configurations, applying the depth deformation map to any other configuration within a certain range such that the generic face model fits a particular model. According to the present disclosure, a face depth image with better precision may be obtained.

It should be understood that the advantageous effects of the present disclosure are not limited to those mentioned above but may be any of the advantageous effects described herein.

BRIEF DESCRIPTION OF THE DRAWINGS

The accompanying drawings, which are included to provide a further understanding of the present disclosure and are incorporated herein as a part of the present disclosure, illustrate embodiment(s) of the present disclosure and together with the description serve to explain the present disclosure, and not to limit the present disclosure in any way. In the drawings.

DETAILED DESCRIPTION

Figures 1, 2:
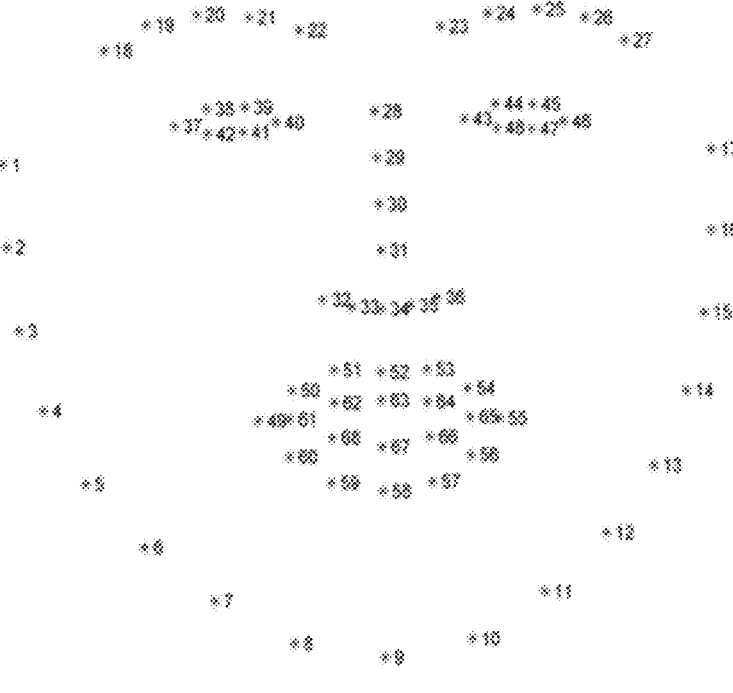
FIG. 1 is a schematic diagram illustrating an example of selecting landmarks of a human face.
FIG. 2 is a schematic diagram illustrating an example of a relative angle between an iToF camera and a captured human face.

Hereinafter, embodiments according to the present disclosure will be described in detail with reference to the accompanying drawings. It should be noted that all sizes, shapes, positional relationships, and the like, in the figures are merely schematic and are not necessarily drawn to scale for convenience of illustration and are thus not limiting. Further, in the embodiments described below, the same components, configurations, steps, and the like, are denoted by the same reference numerals, and repeated explanation thereof will be omitted.

In addition, the present disclosure will be described in the following order.

1. Summary of the face deformation compensating method according to the present disclosure
2. Detailed description of steps for creating a generic face deformation map
   2.1 Description of the steps for creating the generic face deformation map
   2.2 Description of an example of point cloud alignment
   2.3 Description of face landmark extraction in steps S14 and S16
   2.4 Description of an example of morphing the depth difference image
   2.5 Description of an example of interpolation based on capturing parameters
   2.6 Modification of the method for obtaining the first depth difference image
3. Detailed description of a process for compensating depth information using the generic face deformation map
4. Imaging device according to the present disclosure
5. Electronic device according to the present disclosure 1. Summary of the Face Deformation Compensating Method According to the Present Disclosure In the application of face recognition based on iToF, the basic logic flows of the current prevailing methods are similar, all of which is to extract face landmarks from an acquired image, transform them into a suitable subspace, and then measure the similarity or conduct classification learning in this subspace, thereby enabling face recognition.

When the face landmarks are extracted from the acquired image, there are a number of factors, including those described above, that cause deformation of the face image. For example, a person, even if in different poses and with different orientations of his/her face, may still be recognized by humans, but may not be recognized by the computer. Solutions are known to address such problems due to orientations of the face, and, generally, include detecting landmarks of the main features of a face, and then performing alignment on the detected face based on these landmarks. For example, according to the method invented by Vahid Kazemi and Josephine Sullivan in 2014, they chose 68 landmarks as shown in FIG. 1 of a major part of the face, and the positions of the 68 landmarks are fixed, which means that the 68 landmarks can be located on any face simply by constructing a learning system and then training the system. With these 68 landmarks, the face may be corrected through an affine transform to set right the face with an original orientation and eliminate possible errors.

Therefore, it is conceivable that after a depth image information is acquired using an iToF system, it is also possible to extract features, construct a certain corresponding transformation relationship, create a learning system related thereto, and then use the system to correct the face deformation caused by the factors such as MPI and SubSS in different face images captured. Herein, it is believed that when an image is acquired by an iToF camera, the face deformation in the face image due to the various factors described hereinbefore depends mainly on the following factors.

(a) Angle

The angle here refers to a relative angle between a photographing camera and a human face to be photographed. For example, the angle be specified as an angle between an optical axis of the camera and a gaze direction of the human face to be photographed. For example, as shown in FIG. 2, there is a yaw $\theta$ between the optical axis of the camera and the gaze direction of the human face to be photographed.

(b) Distance

The distance here refers to a distance from a camera lens to the human face to be photographed. As shown in FIG. 2, the distance between the optical axis of the camera and the human face to be photographed is d.

Figure 3:
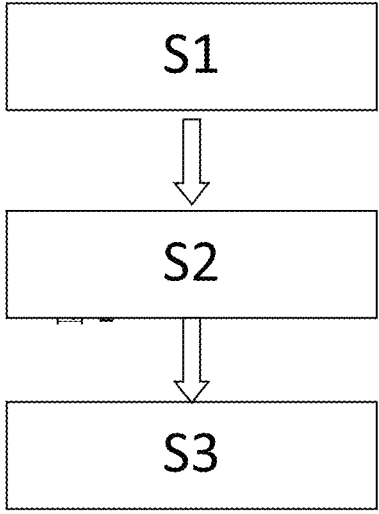
FIG. 3 is a flowchart illustrating main steps of a face compensating method according to the present disclosure.

Based on the above analysis, the face deformation compensating method for a depth image of a human face according to the present disclosure as shown in FIG. 3 may be set to roughly include the following three steps.

In step S1, a generic face deformation map (GFDM) is constructed. As used herein, the GFDM refers to a series of maps or a map library representing the face deformation state of a typical face image. It may also be referred to as a generic face deformation map function since it may also be expressed as a function related to relevant factors, such as angle and distance. This step is similar to the "learning" step described above of constructing and training a learning system. Thus, this step as a whole may be performed only once, and once completed, a "compensating system" may be obtained that later performs face deformation compensation for a particular client face image.

In step S2, a human face of a client as an object to be photographed is photographed, and image data of a face image of the client is acquired. In addition to obtaining the iToF data of the client face, a camera part of the iToF system may also obtain other image data such as IR image data and RGB image data by additionally providing infrared pixels and ordinary camera pixels, and these data are all contained in the image data of the client face image.

In step S3, the GFDM is applied to the client face image so as to correct the face deformation of the client face image.

Hereinafter, embodiments of the above three steps of the face deformation compensating method for the depth image of the human face according to the present disclosure will be described in detail, respectively.

Figure 4:
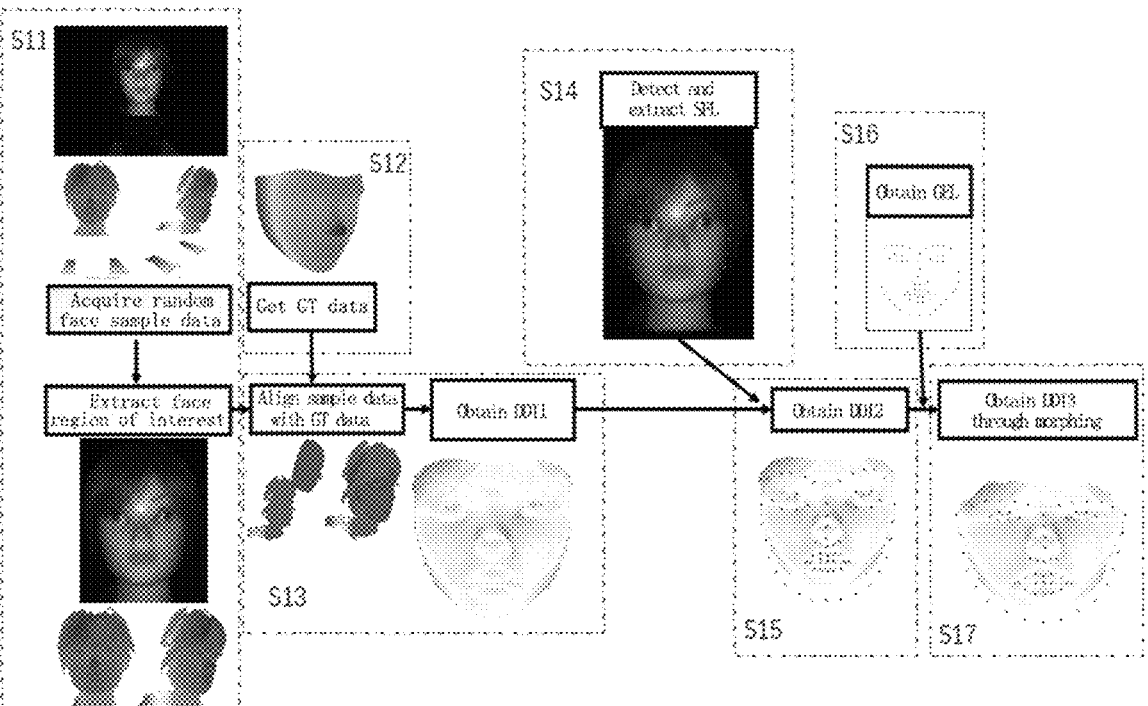
FIG. 4 is a schematic diagram illustrating steps of a process of creating a generic face deformation map and corresponding images in the face compensating method according to the present disclosure.

2. Detailed Description of Steps for Creating the Generic Face Deformation Map 2.1 Description of the Steps for Creating the Generic Face Deformation Map As shown with reference to FIG. 4, the generic face deformation map described hereinabove may be created, for example, in the following manner.

First, in step S11, image data of a random face sample is acquired as sample data. Here, the random face sample may be any face sample of a randomly selected client or subject, or a well-simulated face model. Such image data is acquired by the iToF system for face samples and thus contains at least iToF data and may also contain other types of image data such as IR image data and RGB image data. The depth information of the face sample is contained in the iToF data. Here, face samples may be acquired as desired using any known iToF system. For the acquisition of the sample data, sample data of the entire head may be acquired, or sample data of only a region of interest (ROI), i.e., a face, may be acquired. In the case of the entire head, the step of acquiring sample data should further include a step of clipping and extracting the data of a face region of interest from the acquired iToF data.

Next, in step S12, ground truth (GT) data that serves as a reference for comparison in subsequent steps is acquired. The GT data here is obtained based on an exact face model (3D) of the same random face sample as used in the previous step. For example, the GT data of such an exact face model may be obtained through a three-dimensional scanning technique, a multi-angle camera technique, or the like. The GT data based on such an exact face model has accurate geometric features and skin texture features of the random face sample. Therefore, in the subsequent processing, the generic face deformation map constructed based on such GT data may effectively eliminate or reduce the adverse effects of MPI and SubSS on the face image.

After this, in step S13, the sample data obtained in step S11 and the GT data obtained in step S12 are aligned, and a first depth difference image DDI1 representing a difference in depth information between the GT data and the face region of interest is computed. In particular, the alignment may be achieved through point cloud alignment techniques known in the art.

Figure 5:
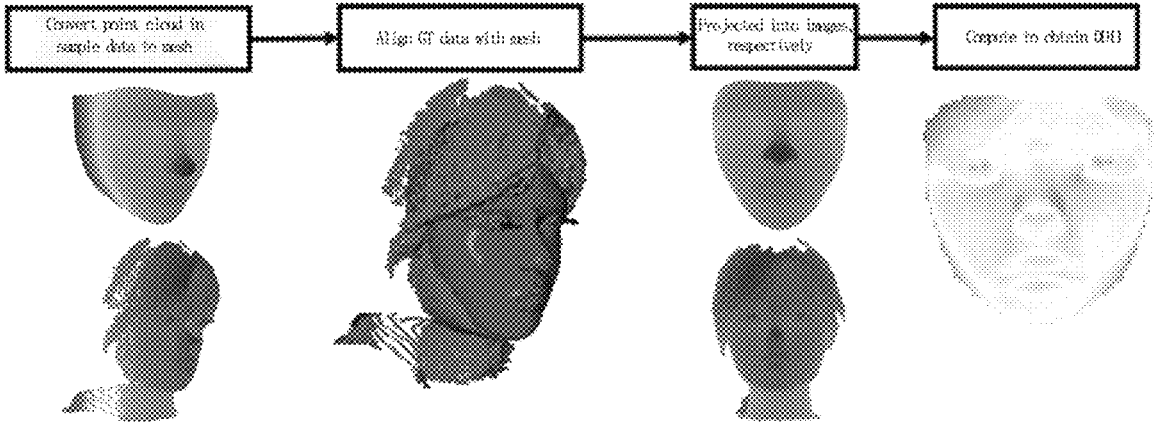
FIG. 5 is a schematic diagram illustrating steps of a process of obtaining a first depth difference image through point cloud alignment and corresponding images according to the present disclosure.

For example, as shown in FIG. 5, a point cloud in the acquired sample data of the region of interest may be first converted to a grid and then the GT data is aligned with the grid. The aligned GT data and mesh are then projected to obtain a projection image of the GT data and a projection image of the sample data of the region of interest. Finally, the first depth difference image DDI1 is computed based on a difference between the projection image of the GT data and the projection image of the sample data of the region of interest. In this case, an output resolution of the first depth difference image DDI1 may be arbitrarily selected.

Examples of point cloud alignment of the sample data with the GT data are described in more detail below.

Next, in step S14, sample face landmarks SFL of the random face sample are detected and extracted from the image data of the random face sample. It should be noted herein that the image data of the random face sample contains at least one of an IR image, a RGB image, and a laser image of the random face sample in addition to the above iToF data for extracting the sample face landmark SFL. For example, the iToF data, IR image data, and RGB image data may be included in the image data of the random face sample by additionally providing infrared pixels and normal image pixels in the camera part of the iToF system. In addition, it should be understood that since the iToF data of the random face sample and the above data used in this step are both from the same image data of the random face sample, the processing described in this step can also be done together in step S11.

The sample face landmarks SFL of the random face sample may be detected and extracted from the acquired image data of the random face sample using any suitable face landmark detection technique in the art. The extracted face landmarks may be, for example, a collection of data of 68 landmarks of the face as shown in FIG. 1. An example of the process of extracting the face landmarks SFL involved in this step will be described below.

Next, in step S15, the sample face landmark SFL is matched with the first depth difference image DDI1 to obtain a second depth difference image DDI2. Such matching may be understood as adding the detected and extracted sample face landmarks SFL to corresponding positions in the first depth difference image DDI1 obtained on the basis of the same random face sample. In other words, the obtained second depth difference image DDI2 contains the sample face landmark SFL as a marker. Thereafter, the second depth difference image DDI2 may also be graphically filtered using various filters to remove impurities from the image, if desired.

Figure 6:
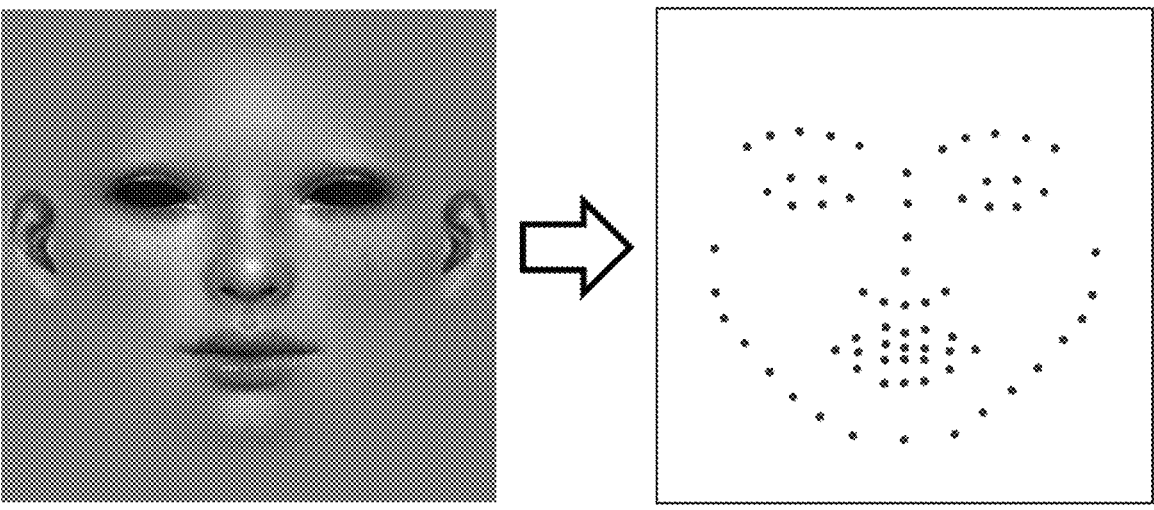
FIG. 6 is a schematic block diagram illustrating generic face landmarks obtained from a generic face.

After this, in step S16, generic face landmark data GFL is acquired. The generic face landmark data GFL is extracted based on a generic face image. As shown in FIG. 6, for example, data representing 68 landmarks of the generic face landmarks as shown in FIG. 1 may be extracted based on the generic face image (here, an IR image) using the method mentioned above. Here, the so-called "generic face image" may be a face image having generic face landmarks of a specific population defined by specific factors of country, region, nationality, gender, etc. In addition to the IR image, other suitable image types are possible, such as the RGB images and laser images. Thus, the generic face landmark data GFL is equivalent to a generic face landmark structure or texture, which is used to correct a coordinate system of face landmarks in subsequent steps so that the corrected coordinate system may be applied to all face deformation compensation.

The process of extracting the generic face landmarks from the generic face image is similar to the face landmark extraction process in step S14 described above, and any known face landmark detection and extraction process in the art may be employed as required. Such a face landmark detection and extraction process may be learned with reference to the following examples. It should be noted that the acquisition of the generic face landmark data GFL may also be done together in step S11, and the generic face landmark data GFL is stored, for example, in a memory, to be called.

Finally, in step S17, the second depth difference image DDI2 is morphed using the sample face landmark data SFL marked in the second depth difference image DDI2 based on the generic face landmark data GFL, to obtain a third depth difference image DDI3 that is matched with and marked with the generic face landmark data GFL.

It should be understood that, under ideal conditions, the third depth difference image DDI3 is the generic face deformation map GFDM. Ideal conditions herein means, for example, in the steps above, when acquiring the data related to the random face sample, the camera of the iToF system is facing the random face sample and the distance between the camera and the random face sample is also fixed. However, in most cases, the capturing parameters (distance, angle) mentioned above vary. Therefore, to obtain the generic face deformation map GFDM, it is also necessary to repeat the above step of generating the third depth difference image DDI3 based on different capturing parameters, thereby generating a plurality of third depth difference images DDI31, DDI32, DDI33, and so on, corresponding to a plurality of sets of capturing parameters (distance, angle). Finally, the generic face deformation map GFDM is obtained through interpolations among the plurality of third depth difference images DDI31, DDI32, DDI33, and so on. In other words, the generic face deformation map GFDM may be expressed by an interpolation function associated with the capturing parameters (distance, angle). Examples of the interpolations related to the acquisition of the generic face deformation map GFDM will be described in detail below. Thereafter, various filters may also be employed to graphically filter the generic face deformation map to remove impurities from the generic face deformation map, as desired.

2.2 Description of an Example of Point Cloud Alignment in Step S13

The method of point cloud alignment involved in the above step S13 is known in the art, for example, point cloud alignment among different datasets may be achieved by calling an algorithm in a Point Cloud Library (PCL) registry to find correct point correspondences in plurality of sets of point cloud datasets acquired based on different views, and aligning them into a single point cloud model. The algorithm in the PCL registry works by finding the correct point correspondences in a given plurality of input datasets and estimating a rigid transformation that may transform all the datasets into consistent global coordinate frames through rotation and translation.

Typically, an output after pairing a pair of point cloud datasets is a rigid transformation matrix (4×4) that represents rotations and translations that must be applied on one of the datasets (referred to as a source collection) in order to perfectly align with the other dataset (referred to as a target collection or model). The step of aligning the point clouds in the two datasets is roughly as follows. It should be noted that any or all of the steps may be traversed as desired.

First, a point of interest (i.e., a keypoint) that best represents a scene (e.g., a human face) in both datasets is determined from a set of points. The keypoint here is a point of interest having a "special attribute" in the scene, e.g., a corner of a book or the letter "S" on a book with "SONY" written. There are many different keypoints available in PCL, such as NARF, SIFT, and FAST. Alternatively, each point or subset may be taken as a keypoint. However, the problem with such direct input is that there are a large number of points in each frame and thus a large number of correspondences are generated.

Next, at each keypoint, a landmark descriptor is computed. Landmark descriptors are taken to assemble information of keypoints and generate vectors to enable them to be compared with each other. Likewise, there are many known landmark options available, such as NARF, FPFH, BRIEF, or SIFT.

Next, from the collection of landmark descriptors and their positions on X, Y, and Z axes in the two datasets, a set of correspondences is estimated based on the similarity between landmarks and positions.

After this, given that the data is generally considered to be noisy and not all correspondences are valid, those bad correspondences that do not favor the alignment process are rejected. For example, rejection of the bad correspondences may be accomplished by using RANSAC or by reducing the number of and using only a proportion of the correspondences found.

Finally, from the remaining set of good correspondences, the actual motion transformation is computed, and iterations are conducted until some convergence criteria are met, thereby obtaining the transformation relationship for aligning point clouds.

2.3 Description of Face Landmark Extraction in Steps S14 and S16

The sample face landmark SFL of the random face sample needs to be detected and extracted from the image data of the random face sample in step S14 described hereinbefore, whereas the generic face landmark data GFL needs to be extracted based on the generic face image in step S16. Face landmarks generally refer to face structures for locating and representing salient regions of a face. Face landmark detection is subordinate to shape prediction. Given an input image (typically, given an ROI of an object of interest), a shape predictor will attempt to locate keypoints of interest along the shape. Various methods are available in the art for face landmark detection and extraction. The following is a general description of examples only.

Typically, detecting face landmarks involves a two-step process, wherein
   step 1 is to locate a face in the image; and
   step 2 is to detect key face structures in the ROI of the face.

Face detection (step 1) may be achieved in various manners. For example, a built-in Haar cascade of OpenCV may be used. This may apply to HOG+Linear SVM object detectors that are pre-trained specifically for face detection tasks. Alternatively, deep learning-based algorithms may even be used for face location. For the purposes of the present disclosure, it is not important what method is used to detect a face in an image, as long as a face bounding box, i.e., the (x, y) coordinates of the face in the image, can be obtained.

Given a face region, step 2 may then be applied to detect key face structures in the face region. Various face landmark detectors and detection algorithms are already available in the art, but all the methods essentially attempt to locate and mark the following face regions, that is, mouth, right eyebrow, left eyebrow, right eye, left eye, nose, and lower jaw.

For example, a face landmark predictor using 68 landmarks to represent key face structures as proposed by Kazemi and Sullivan as shown in FIG. 1 contained in dlib may be used. Apparently, there are other types of face marker detectors, including a model involving 194 landmarks that may be trained in a HELEN dataset. They may be used for real-time detection of face landmarks with high quality:

Whichever dataset is used, the same dlib framework may be used to train the predictor based on the input training data. This would be very useful where a dedicated face landmark detector or custom shape predictor needs to be trained.

It should be understood that the above is merely an exemplary description of extracting face landmarks from a face image. Any suitable method of face landmark detection and extraction may be selected as desired. In order to highlight the essentials, repeated description will be omitted here.

2.4 Description of an Example of Morphing the Depth Difference Image in Step S17

The process of morphing the second depth difference image DDI2 to obtain the third depth difference image DDI3 by using the sample face landmark data SFL marked in the second depth difference image DDI2 based on the generic face landmark data GFL described above in step S17 will be described in detail.

To transform an image I into an image J, a pixel correspondence needs to be established between the two images first. In other words, for each pixel $(x_i, y_i)$ in the image I, it is necessary to find its corresponding pixel $(x_j, y_j)$ in the image J. Assuming these correspondences are found, the image morphing may be done in two steps. First, it is necessary to calculate the positions $(x_m, y_m)$ of the pixels in the morphed image, which are given by the following equation:

$$x_m = (1 - \alpha)x_i + \alpha x_j \qquad (1)$$

$$y_m = (1 - \alpha)y_i + \alpha y_j \qquad$$

Secondly, it is necessary to find the pixel intensity at $(x_m, y_m)$ through the following equation:

$$M(x_m, y_m) = (1 - \alpha)I(x_i, y_i) + \alpha J(x_j, y_j) \qquad (2)$$

Apparently, a corresponding point in the image J may be found for each pixel in the image I according to Equations (1) and (2) above, but it is time consuming, laborious and unnecessary. Here, if it is possible to calculate the correspondence of only some representative keypoints, the process would be greatly simplified. Therefore, it is conceivable here to use the extracted face landmarks representing the key structures of the face to establish the correspondence and to conduct interpolations for the remaining pixels, thereby simplifying the morphing process.

Figure 7:
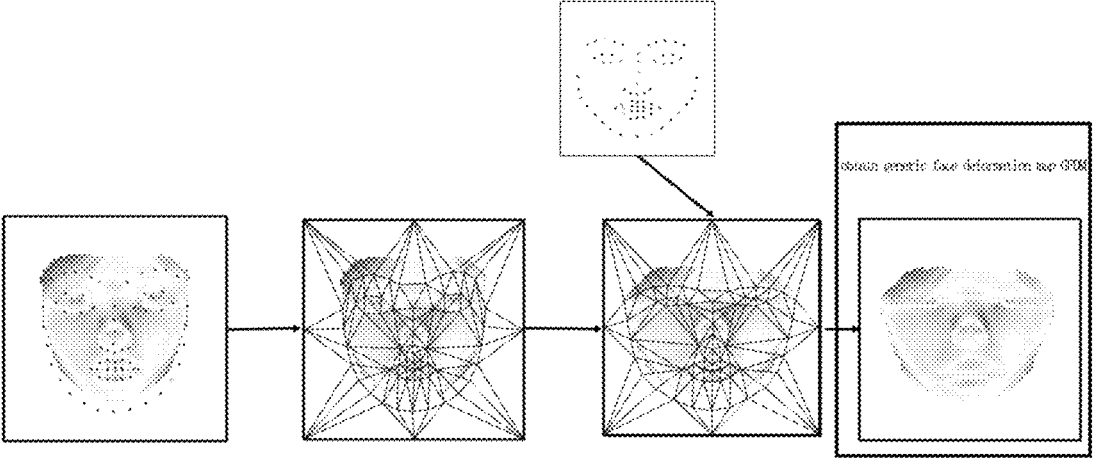
FIG. 7 is a schematic diagram illustrating an example of achieving morphing of the depth difference image by utilizing face landmark detection and Delaunay Triangulation according to the present disclosure.

In the present disclosure, for example, the correspondence may be established using the 68 landmarks described above as corresponding points. Therefore, these corresponding points are first acquired. As shown in FIG. 7, the sample face landmark data SFL marked in the second depth difference image DDI2 is data of 68 landmarks as corresponding points. Apparently, it should be understood that more points may be added or partial points may be reduced as desired.

For example, it is possible to add landmarks at positions of both ears, the cranium vertex center, the zygomatic apex, and the like, as corresponding points.

Then, as shown in FIG. 7, a Delaunay triangulation of the second depth difference image DDI2 based on these points is conducted. The result of the Delaunay triangulation is a list of triangles represented by the indices of the points in the 68-landmark array. As shown in FIG. 7, the triangulation cuts the second depth difference image DDI2 into several triangles, and the vertices of each triangle are 3 out of the 68 landmarks. Triangulation is stored as a three-column array, for example, in the form of:

(38, 40, 37), (35, 30, 29), (38, 37, 20), (18, 37, 36), (33, 32, 30) . . . .

It is conceivable that if two face images are triangulated on the basis of the same landmarks, the corresponding triangles in the two images represent similar face regions. Thus, a triangular (or regional) correspondence between the two face images can be obtained.

After triangulating the second depth difference image DDI2, since the generic face landmark data GFL has been acquired, the positions and coordinates of each landmark in the second depth difference image DDI2 in the image after morphing are already known. Each triangle in the second depth difference image DDI2 may then be morphed by computing an affine transform such that the position of each landmark in the second depth difference image DDI2 matches the position of each landmark in the generic face landmark data GFL. Through such triangle matching, the second depth difference image DDI2 is morphed into the third depth difference image DDI3 representing the generic face deformation map GFDM.

The affine transform mentioned above is the simplest method to convert a set of 3 points (i.e., one triangle) into another set of arbitrary 3 points (i.e., another triangle). It encodes translation/shift, scale, rotation, and shear. For example, the shape of a square may be changed to a parallelogram in any direction and scale using the affine transform. However, the affine transform is not flexible enough to transform a square into an arbitrary quadrilateral. In other words, after the affine transform, parallel lines in a graph maintain a parallel relationship.

Currently, there are a plurality of software libraries that can implement the computation of the affine transform. For example, in OpenCV, the affine transform is a 2×3 matrix. The first two columns in the matrix encode rotation, scale, and shear, and the last column encodes translation.

$$S = \begin{bmatrix} a & b & t_x \\ c & d & t_y \end{bmatrix} \qquad (3)$$

Therefore, for a point $(x, y)$, a point $(x_t, y_t)$ after the affine transform may be obtained through the following equation:

$$\begin{bmatrix} x_t \\ y_t \end{bmatrix} = \begin{bmatrix} a & b \\ c & d \end{bmatrix} \begin{bmatrix} x \\ y \end{bmatrix} + \begin{bmatrix} t_x \\ t_y \end{bmatrix} \qquad (4)$$

Thus, through the affine transformation, a matching morphing of each triangle in the above second depth difference image DDI2 with the generic face landmark data GFL may be achieved.

2.5 Description of an Example of Interpolation Based on Capturing Parameters in Step S17

As described above, in most cases, the capturing parameters (distance, angle) of the iToF system may change, which is one of the causes of face image deformation. Therefore, in most cases, to obtain the generic face deformation map GFDM, it is also necessary to repeat the above step of generating the third depth difference image DDI3 based on different capturing parameters, so as to generate a plurality of third depth difference images DDI31, DDI32, DDI33, and so on, corresponding to a plurality of sets of capturing parameters (distance, angle). Finally, the generic face deformation map GFDM is obtained through interpolations among the plurality of third depth difference images DDI31, DDI32, DDI33, and so on. Hereinafter, an interpolation function associated with capturing parameters (distance, angle) for expressing the generic face deformation map GFDM according to the present disclosure will be described in detail.

Figure 8:
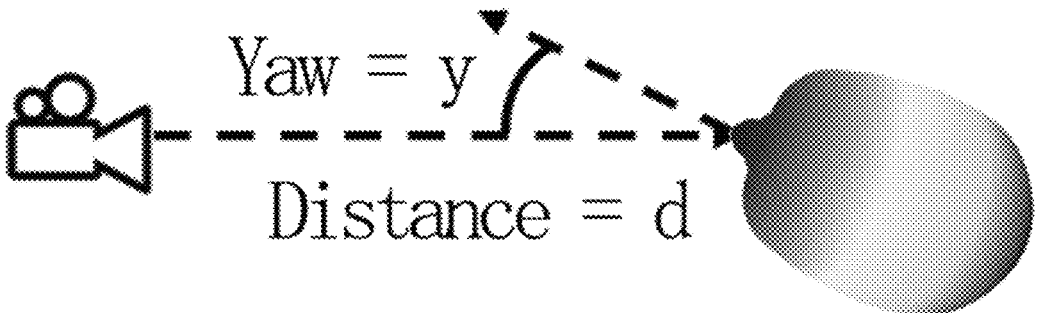
FIG. 8 illustrates an example of photographing functions according to an embodiment of the present disclosure.
Figure 8:
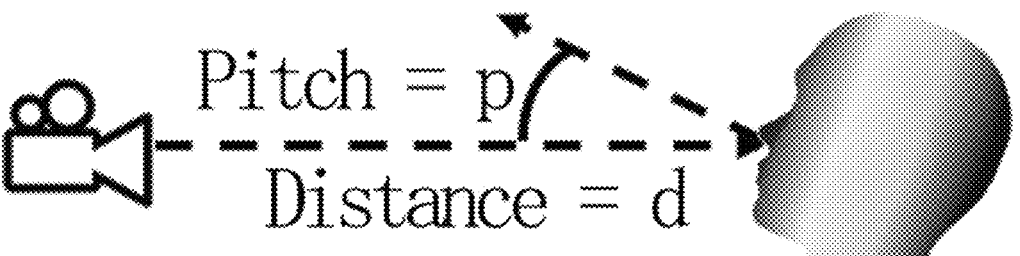

As described above, the distance between the iToF camera and a subject's face and the angle between the optical axis of the iToF camera and a gaze direction of a subject's face may be taken as the capturing parameters herein. FIG. 8 shows an example of distance and angle as a function of photographing. It is envisaged that only the depth difference image at a particular keypoint configuration, i.e., the third depth difference image DDI3, needs to be computed using the method described above, and then the results at other configurations are interpolated to obtain the generic face deformation map GFDM. It will be appreciated that other parameters may be added in addition to distance and angle. For example, if an RGB image is obtained, a color parameter may be added to account for the color of the skin. However, when using infrared light, the acquired skin data is more uniform (e.g., a level difference between white skin and black skin is about 15%), well below the RGB domain. Therefore, the method using only distance and angle as parameters may be considered effective for all types of skin.

Figure 9:
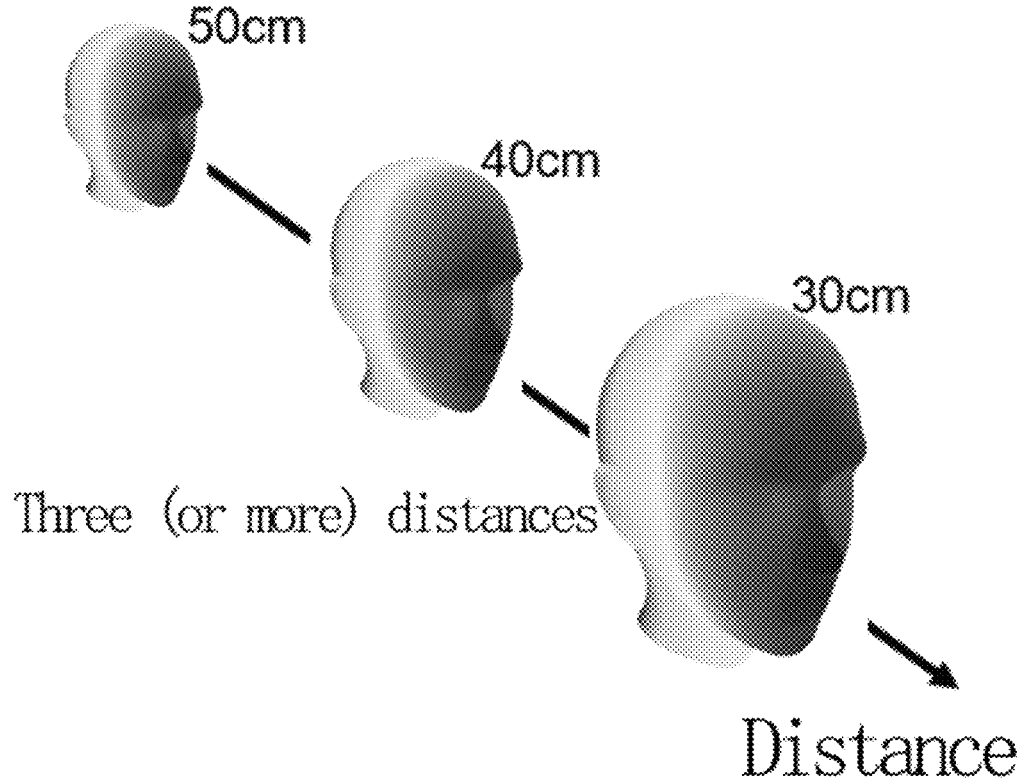
FIG. 9 illustrates an example of photographing functions at different distances according to the present disclosure.
Figure 10:
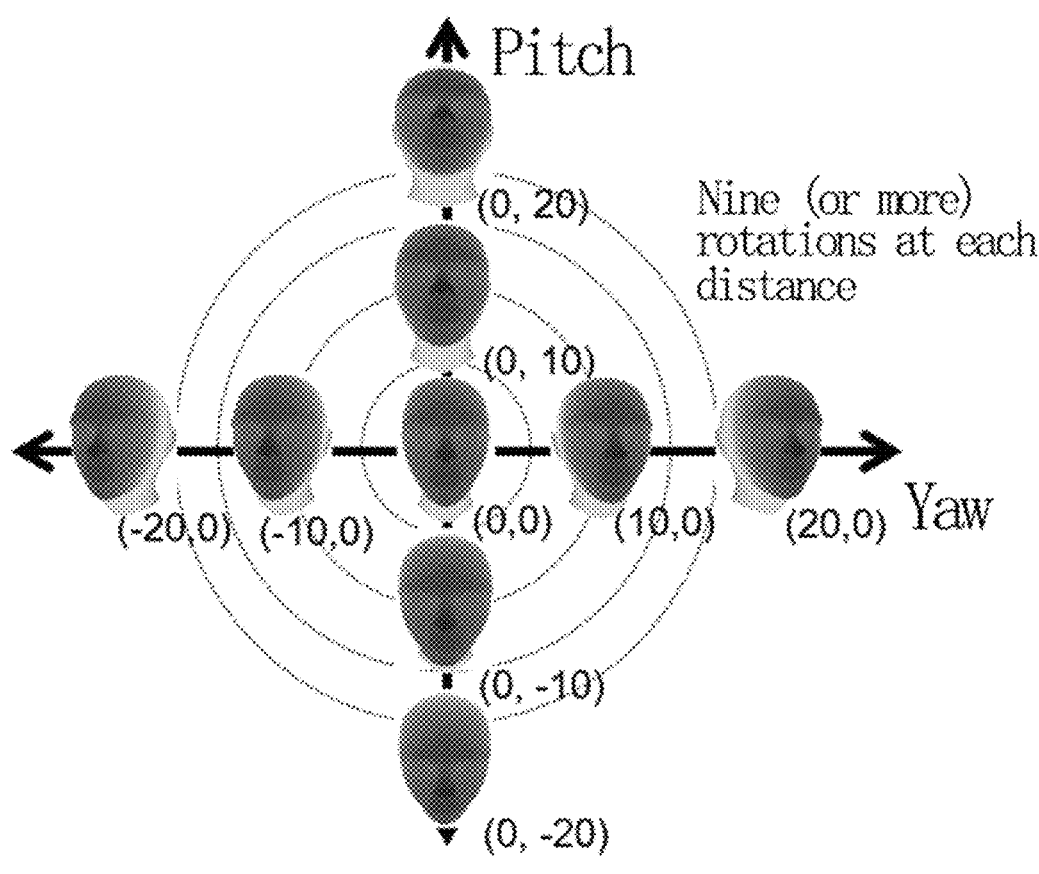
FIG. 10 illustrates an example of photographing functions from different angles at the same distances according to the present disclosure.

As shown in FIGS. 9 and 10, for example, at least three distances may be considered, with at least nine points at each distance as the keypoint configurations. For example, the distances are 30 cm, 40 cm, and 50 cm. By changing the pitch and yaw between the face to be taken with respect to the optical axis of the camera at each distance, the nine keypoint configurations as shown in FIG. 10 are obtained. In this way, a total of, for example, at least twenty-seven keypoint configurations are obtained.

Therefore, the third depth difference image DDI3 for each keypoint configuration may be obtained by changing the capturing parameters and repeating the method of obtaining the third depth difference image described in the foregoing. In this way, the generic face deformation map GFDM may be conceived as a set containing depth difference images at a plurality of keypoint configurations for interpolation. Thus, such an interpolation may be defined as the following expression to represent the state of the pixel (x, y):

$$\Delta(x, y) = \text{interpolate\_generic\_deformation}(x, y, \text{yaw}, \text{pitch}, \text{distance})$$

Here, the interpolate_generic_deformation is an interpolation function based on the depth difference images at all the keypoint configurations (e.g., totaling twenty-seven), whereby the generic face deformation map GFDM adapted to all possible positions may be obtained.

Figure 11:
FIG. 11 is a schematic diagram illustrating an example of a second depth difference image at a keypoint configuration according to the present disclosure.
Figure 12:
FIG. 12 is a schematic diagram illustrating an example of a third depth difference image at the keypoint configuration according to the present disclosure.
Figure 13:
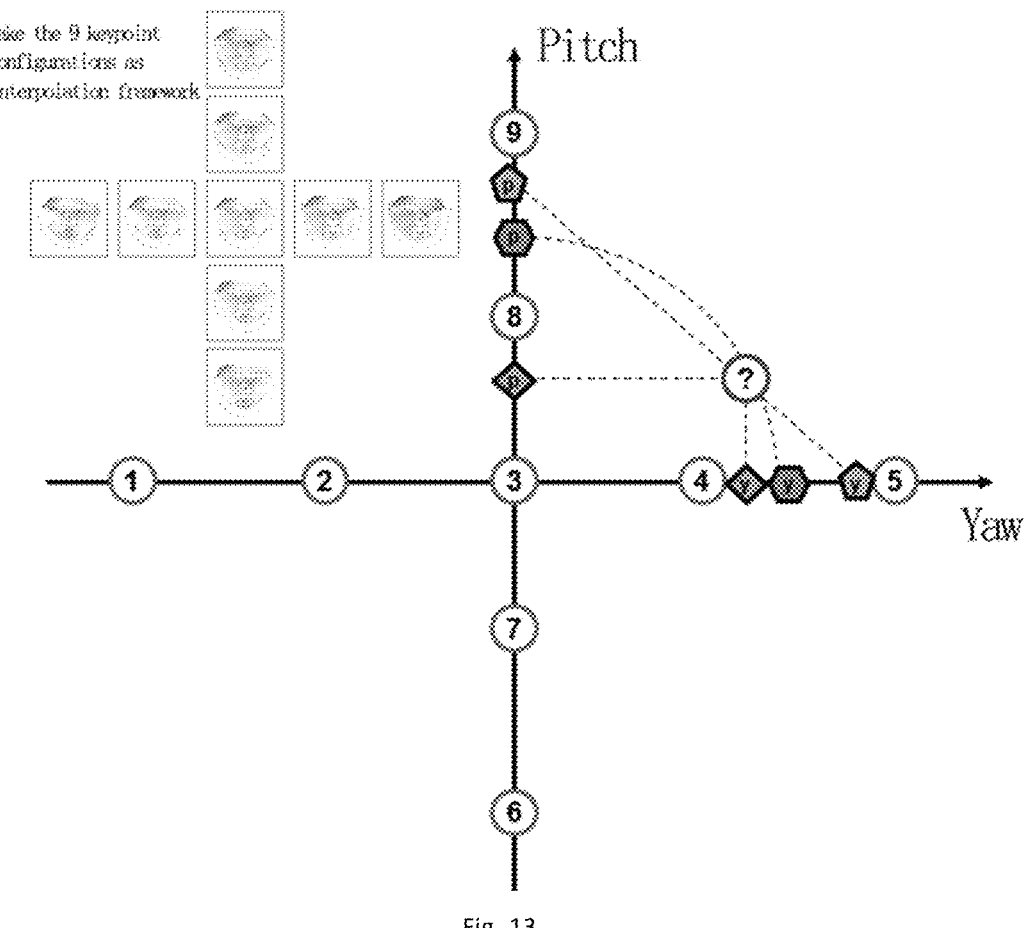
FIG. 13 is a schematic diagram illustrating a process of interpolation based on the third depth difference image at the keypoint configuration according to the present disclosure.

Next, the following will briefly describe the concept and process of interpolation based on the depth difference images at the keypoint configurations with reference to FIGS. 11 to 13.

Illustrated in FIG. 11 are filtered second depth difference images DDI2 marked with sample face landmark data SFL, e.g., obtained at nine keypoint configurations at a distance of 50 cm from the camera. The third depth difference images DDI3 marked with the generic face landmark data GFL obtained after morphing the nine second depth difference images DDI2, respectively, are shown in FIG. 12.

Assuming that the distance is constant, and then an interpolation may be performed using these nine third depth difference images DDI3 so as to find a third depth difference image DDI3 at any position at the distance. FIG. 13 illustrates the process. A mark "?" in the figure represents a third depth difference image at a position that needs to be obtained using interpolation. It is conceivable that the coordinates of "?" in the coordinate system may be figured out in three possible ways. For example, the quadrangular coordinates of FIG. 13 indicate direct values $(y_D, p_D)$, the pentagonal coordinates indicate linear values $(y_L, p_L)$, and the hexagonal coordinates indicate circular arc values $(y_C, p_C)$. Whichever way is taken, an interpolation value of a yaw map at "?" (i.e., y-value) may be calculated through interpolation of the yaw maps of nine second depth difference images DDI2 as a framework for the interpolation. For example, as shown in FIG. 13, the y-value at "?" may be calculated through interpolation of the y-value of the second depth difference images DDI2 at the 4th position and at the 5th position. Similarly, an interpolation value of a pitch map at "?" (i.e., p-value) may be calculated through interpolation. For example, as shown in FIG. 13, the p-value at "?" may be calculated through interpolation of the p-value of the second depth difference images DDI2 at the 8th position and at the 3rd position.

A blending value between the interpolated pitch map and the interpolated yaw map may then be calculated from the following equation:

$$Diff = k * y + (1 - k) * p \tag{5}$$

where k here is a ratio of the p-value to the y-value, expressed by the following equation:

$$k = y/(y + p) \tag{6}$$

In the above Equations (5) and (6), different k values may be set using different interpolation types as needed to obtain the direct value $(y_D, p_D)$, linear value $(y_L, p_L)$ and/or circular arc value $(y_C, p_C)$. Further, if both the y-value and the p-value are 0, k=0.5 is set.

It will be appreciated that the interpolation procedure described above within the same distance also applies to more cases of yaw and pitch angle axes. With such an extension, there are more third depth difference images at the keypoint configurations as the interpolation framework, and the interpolation becomes more refined.

Figure 14:
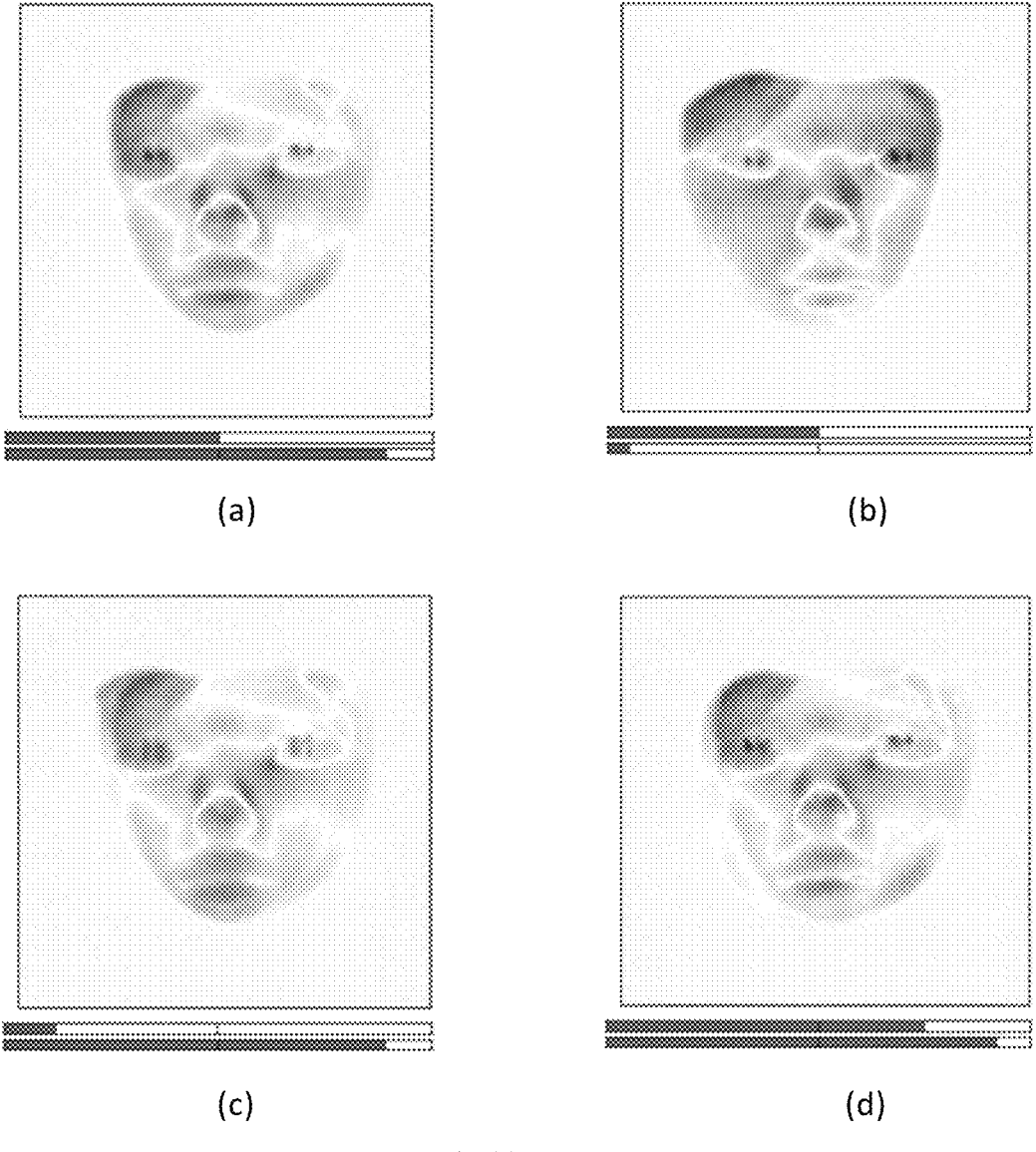
FIG. 14 is a schematic diagram of a simulation result of the interpolation based on the third depth difference image at the keypoint configurations at the same distances according to the present disclosure.

Simulation diagrams of the third depth difference images DDI3 at four random positions at 50 cm as found through the interpolation of FIG. 13 are shown in portions a to d of FIG. 14. In portions a to d of FIG. 14, the two bars below the image respectively represent a pitch value and a yaw value at the position, and when the angle is 0, a color block is in the middle of the bar.

In the following, the interpolation taking into account the distance in actual use is discussed.

First, known from the above description, it is possible to respectively interpolate the pitch value and yaw value at any position within the same distance as described above for a plurality of distances (e.g., three distances, which are 50 cm, 40 cm, and 30 cm, respectively). Then, as shown in FIG. 15, the interpolation of the depth difference image at any position at a given distance, pitch, and yaw, (e.g., at "?" in the figure) may be performed as follows.

Figure 15:
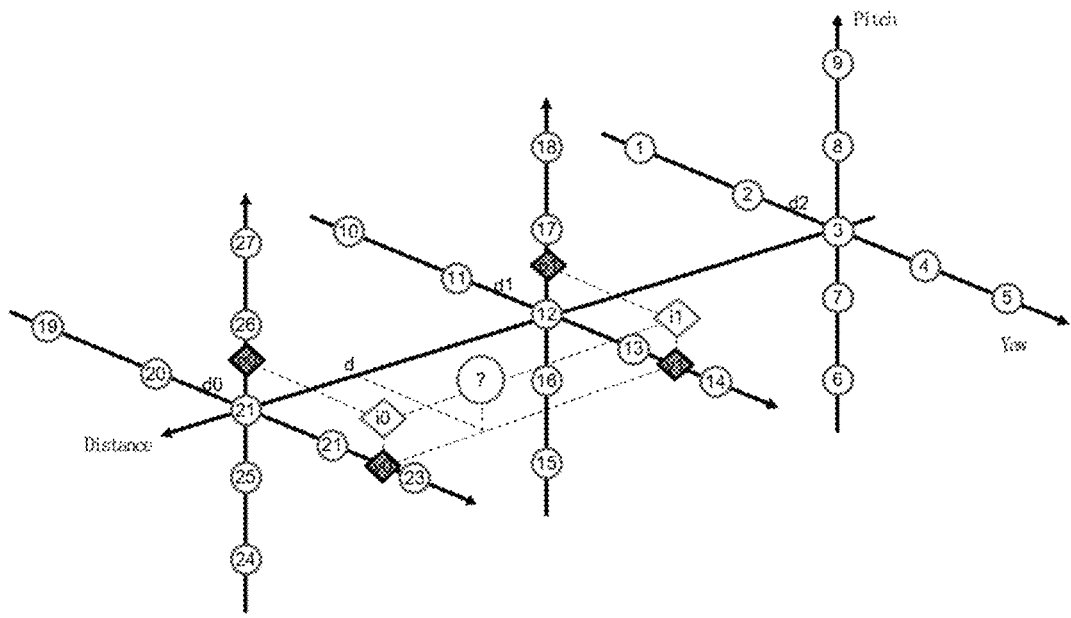
FIG. 15 is a schematic diagram illustrating a process of interpolation based on a third depth difference image at a keypoint configuration according to the present disclosure.

(1) The corresponding pitch value p and yaw value y are calculated through interpolation in the closest proximal coordinate system to a given position (d) of the coordinate systems at three distances (e.g., 30 cm (d0), 40 cm (d1) and 50 cm (d2) as shown in FIG. 15). In the example shown in FIG. 15, the position of "?" is between 30 cm (d0) and 40 cm (d1), hence in the closest proximal coordinate system, which is one at 30 cm, y0 and p0 are calculated through interpolation described above, and then i0 is derived;

(2) next, the corresponding pitch value p and yaw value y are calculated through interpolation in the closest distal coordinate system to a given position of the coordinate systems at three distances. In the example shown in FIG. 15, in the closest distal coordinate system, which is one at 40 cm, y1 and p1 are calculated through interpolation described above, and then i1 is derived;

(3) finally, i0 and i1 are interpolated based on the following distance coefficient:

$$Diff = k * i0 + (1 - k) * i1 \qquad (7)$$

In the above Equation (7), k=(d1+d)/(d1+d0).

Thus, by repeatedly iterating the above interpolation, it is possible to obtain a depth difference image capable of representing any position through the interpolation among the third depth difference images DDI3 at all the available keypoint configurations, and such an image collection or function is a generic face deformation map GFDM according to the present disclosure.

It should be understood that in the above interpolation, it is also possible to first calculate the corresponding pitch value p and yaw value y through interpolation in the closest distal coordinate system to the given position, and then calculate the corresponding pitch value p and yaw value y through interpolation in the closest proximal coordinate system to the given position. In addition, it will be appreciated that in order to make the created generic face deformation map GFDM more accurate, a plurality of sets of sample data may be acquired for a plurality of random face samples based on the same capturing parameters. The above interpolation is then performed separately for each set of sample data to obtain a plurality of sets of third depth difference images. Finally, for each set of capturing parameters, average third depth difference images at corresponding positions in the plurality of sets of sample data are computed, thereby obtaining the generic face deformation map GFDM composed of the plurality of average third depth difference images.

2.6 Modification of the Method for Obtaining the First Depth Difference Image

In the above, an example of obtaining the first depth difference image DDI1 through point cloud alignment has been explained with reference to FIG. 5. In addition, other methods may be used to obtain the first depth difference image DDI1 from the acquired point cloud data depending on circumstances.

Figure 16:
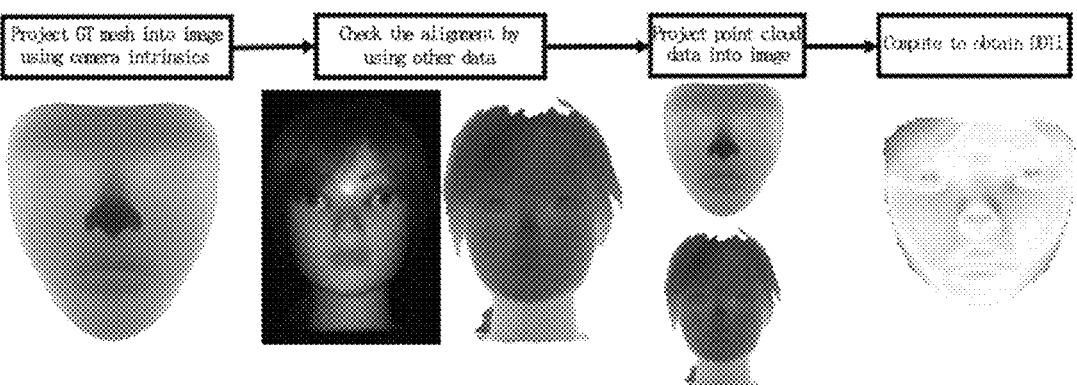
FIG. 16 is a schematic diagram illustrating a modification of the process of obtaining the first depth difference image according to the present disclosure.

For example, as shown in FIG. 16, in a case where the camera intrinsics of the iToF camera in use are known, a GT mesh may be directly projected into a depth image in a depth image domain using the camera intrinsics; next, a point cloud in the obtained sample data of the face region of interest is projected to obtain a projection image of the face region of interest, and then the first depth difference image DDI1 is computed based on the projection image of the GT and the projection image of the face region of interest.

The camera intrinsics here are a set of functions or models related to the intrinsic imaging properties of the iToF camera in use, which are able to represent the positional conversion relationship of an arbitrary point in the subject to a corresponding point in the image captured by the camera. For example, the intrinsic properties of the camera may include a model of the relationship between a point in the iToF camera coordinates and its projection on the image. Such a model is, for example, a pinhole model represented by a camera matrix (homogeneous coordinate) as follows.

$$\begin{bmatrix} x \\ y \\ w \end{bmatrix} = \begin{bmatrix} f_x & s & c_x \\ 0 & f_y & c_y \\ 0 & 0 & 1 \end{bmatrix} \begin{bmatrix} X \\ Y \\ Z \end{bmatrix} \qquad (8)$$

In Equation (8) above, $f_x$ and $f_y$ are focal lengths of a lens in the x and y directions; $c_x$ and $c_y$ are camera principal point positions; s is a skew factor.

In addition, intrinsic properties of the camera may also include a distortion parameter $d=[k_1 \ k_2 \ k_3 \ p_1 \ p_2]$. Here, $k_1$, $k_2$, and $k_3$ are axial distortion parameters and $p_1$ and $p_2$ are tangential distortion parameters.

By calling these known camera intrinsics, the GT mesh may be directly projected into a depth image in the depth image domain.

In addition, as shown in FIG. 16, in the present modification, it is also possible to confirm whether the projection image of the GT is aligned using other types of image data (e.g., IR images, RGB images or laser images, etc.) before computing the first depth difference image DDI1. It should be understood that this step is not necessary.

3. Detailed Description of a Process for Compensating Depth Information Using the Generic Face Deformation Map First, the simplest case is discussed, where a client face image is captured under exactly the same conditions as when a sample face image was captured previously. That is, the client face image has exactly the same capturing parameters as the sample face image. In this case, client face landmark data CFL is first detected and extracted from the client face image. Then, the generic face deformation map GFDM is morphed such that the marked generic face landmark data in the generic face deformation map GFDM matches the detected client face landmark data CFL. The morphing here can be understood as the inverse process of the morphing described hereinbefore. Thereby, a fourth depth difference image DDI4 (not shown) is obtained. Finally, the depth information in the client face image is compensated based on the fourth depth difference image DDI4.

Figure 17:
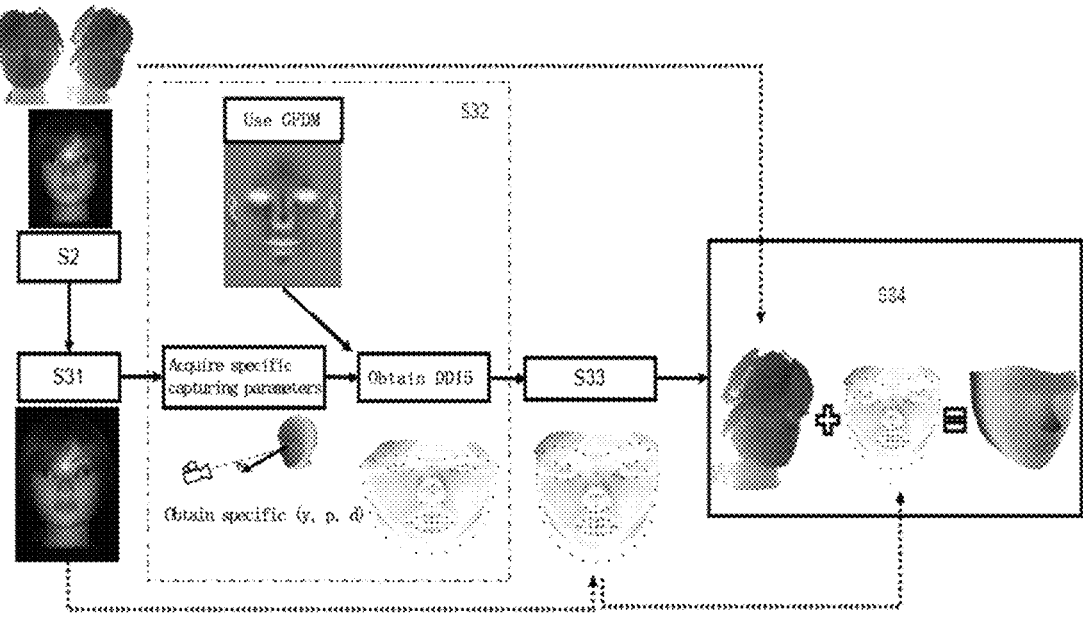
FIG. 17 is a flowchart illustrating an example of a process of applying a generic face deformation map to compensate for depth information according to the present disclosure.

Apparently, different from the simplest case described above, the imaging conditions for the real client face image and the sample face image obtained in the learning process are different in many cases. In such cases, the depth information in the client face image may be compensated by computing a face deformation map corresponding to the client face image using the generic face deformation map GFDM. The steps of an embodiment in which the generic face deformation map is applied to compensate for depth information in these cases will now be described with reference to FIG. 17. Note that, for clarity of illustration, step S2 of photographing the face of the client to acquire image data of the client face image described above is also shown in FIG. 17.

In step S31, the client face landmark data CFL is detected and extracted from the captured client face image. The method of performing this step may be learned with reference to the example of face landmark detection and extraction described above.

Figure 18:
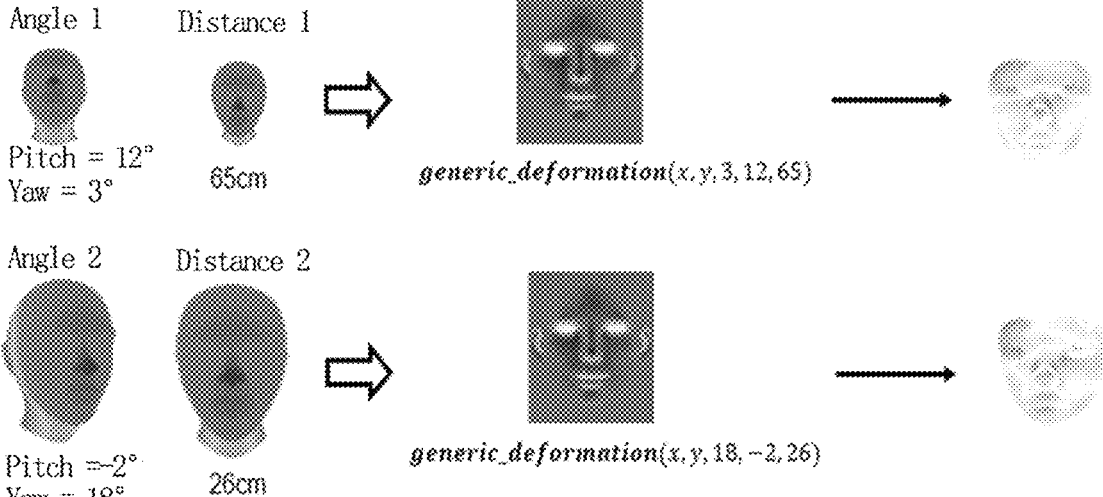
FIG. 18 is a flowchart illustrating an example of obtaining a particular fifth depth difference image (DDI5) from the generic face deformation map (GFDM) on the basis of particular capturing parameters.

Next, in step S32, the capturing parameters (distance, angle) of the client face image are acquired, and the capturing parameters are interpolated into the generic face deformation map GFDM to obtain a specific fifth depth difference image DDI5 marked with the generic face landmark data GFL corresponding to the specific capturing parameters of the client face image. An example of such a fifth depth difference image DDI5 with two specific point structures obtained from the generic face deformation map GFDM on the basis of specific two sets of capturing parameters is illustrated in FIG. 18.

Then, in step S33, the fifth depth difference image DDI5 is morphed so that the generic face landmark data GFL marked in the fifth depth difference image DDI5 matches the detected client face landmark data CFL, thereby obtaining a sixth depth difference image DDI6.

Finally, in step S34, the iToF depth information in the client face image captured by the iToF camera is compensated based on the sixth depth difference image DDI6 to obtain a corrected client face image.

In the above, a method capable of compensating for face deformation of a face image acquired in an iToF manner according to the present disclosure is described. In the method according to the present disclosure, a depth deformation map associated with face landmark information is created to correct depth errors generated by the iToF device when capturing a known scene (here, a human face). Such depth deformation maps are created from recorded scenes at different key configurations (e.g., yaw, pitch, distance) and then transformed to fit a generic face model. Furthermore, compensation for the depth deformation of any particular face image is achieved by computing a required deformation based on deformation interpolation at key configurations, and applying the depth deformation map to any other configuration within a certain range such that the generic face model fits a particular model. According to such a method, a face depth image with better precision may be obtained.

4. Imaging Device According to the Present Disclosure

Figure 19:
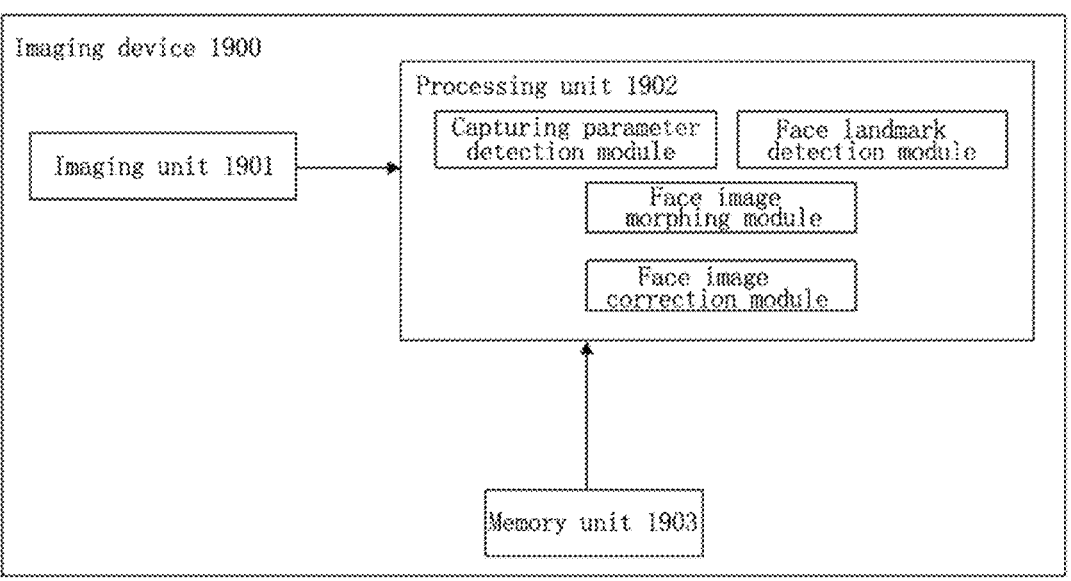
FIG. 19 is a block diagram illustrating an example of a configuration of an imaging device according to an embodiment of the present disclosure.

The present disclosure also provides an imaging device. The imaging device is capable of imaging by using an iToF imaging unit and of compensating the imaged face depth image by applying the face deformation compensating method described in the foregoing. A configuration example of the imaging device 1900 according to the present disclosure will be described below with reference to FIG. 19. The imaging device 1900 is provided with, for example, an imaging unit 1901, a processing unit 1902, and a memory unit 1903.

The imaging unit 1901 may include an iToF sensor to acquire iToF data of the client's face. The imaging unit 1901 outputs the iToF data acquired by the iToF sensor to the processing unit 1902, which is described later. The iToF data may lead to distance information (depth) of the subject by calculating a phase difference between the incident light and the reflected light based on the sensor data. In addition, the imaging unit 1901 may also include other types of optical imaging units or sensor units to acquire other types of image information such as those of IR images, RGB images, or laser images.

The processing unit 1902 includes a capturing parameter detection module, a face landmark detection module, a face image morphing module, and a face image correction module. The processing unit 1902 may perform the face compensating method of the present disclosure as described above through corresponding modules.

For example, the processing unit 1902 can acquire capturing parameters of the client's face image, such as an angle (e.g., yaw and pitch) between a face gaze direction and an optical axis of the imaging device 1901 as described above, and a distance between the imaging device 1901 and the client face, by the capturing parameter detection module. The processing unit 1902, by the face landmark detection module, can detect and extract the client face landmark data CFL from the client face image (e.g., IR or RGB images) obtained by the imaging unit 1901. The processing unit 1902 can further interpolate the capturing parameters of the client face image acquired through the capturing parameter detection module into the generic face deformation map GFDM obtained from the memory unit 1903. The processing unit 1902, by the face image morphing module, can further deform the generic face deformation map GFDM obtained from the memory unit 1903. Also, the processing unit 1902, by the face image correction module, can correct the face deformation of the client face image by compensating the depth information in the client face image with the generic face deformation map after morphing. The generic face deformation map GFDM stored in the memory unit 1903 may be pre-computed and stored therein. Alternatively, the processing unit 1902 can further include a generic face deformation map computing module (not shown) that computes a generic face deformation map GFDM according to the method described above by calling data from the capturing parameter detecting module and the face landmark detecting module, and stores the same in the memory unit 1903 for use.

The imaging device according to the present disclosure is capable of creating a depth deformation map associated with face landmark information to correct depth errors generated by the iToF device when capturing a known scene (here, a human face). Such depth deformation map is created from recorded scenes at different key configurations (e.g., yaw, pitch, and distance) and then transformed to fit a generic face model. Furthermore, the imaging device according to the present disclosure enables compensation of the depth deformation of any particular face image by applying a depth deformation map to any other configuration within a certain range by computing a required deformation based on deformation interpolation at keypoint configurations, thereby enabling the generic face model to be fitted to a particular model. Therefore, the imaging device according to the present disclosure may obtain a face depth image with better precision.

5. Electronic Device According to the Present Disclosure

In addition to the imaging device described above, the compensating method according to the present disclosure as described above may have many other applications. For example, the method may also be applied to other electronic devices and systems than the imaging device, for example, a pedestrian recognition system in a vehicle-mounted automatic driving system, a security system, a mobile payment platform, and the like.

Figure 20:
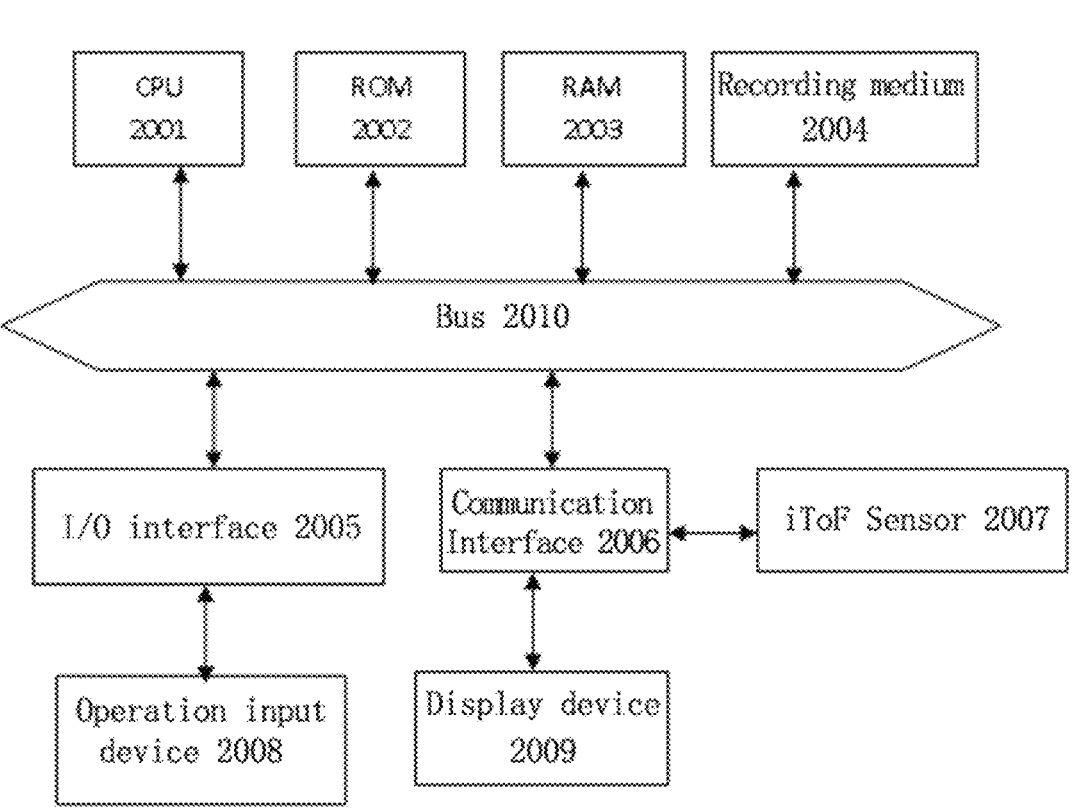
FIG. 20 is a block diagram illustrating an example of a configuration of an electronic device according to an embodiment of the present disclosure.

A configuration example of a electronic device 2000 according to an application example of the present disclosure will be described below with reference to FIG. 20. The electronic device 2000 has, for example, a CPU 2001, a ROM 2002, a RAM 2003, a recording medium 2004, an I/O (Input/Output) interface 2005, a communication interface 2006, an operation input device 2008, and a display device 2009. Furthermore, the electronic device 2000 is provided with an iToF sensor 2007 or is able to communicate with the iToF sensor 2007. Further, in the electronic device 2000, components are connected to each other via, for example, a bus 2010 as a data transmission path.

The CPU 2001 includes, for example, one or two or more processors or various processing circuits configured by an arithmetic circuit such as a CPU, and functions as a control unit that controls the electronic device 2000 integrally. Also, CPU 2001 may execute a program based on the method of the present disclosure as described above.

The ROM 2002 stores control data such as a program or an operation parameter used by the CPU 2001. The RAM 2002 temporarily stores, for example, a program executed by the CPU 2001, etc.

The recording medium 2004 stores various data such as an image used in the method according to the above embodiment. Here, as the recording medium 2004, for example, a nonvolatile memory such as a flash memory or the like may be provided. Moreover, the recording medium 2004 may be loaded onto and unloaded from the electronic device 2000.

The I/O interface 2005 is connected to, for example, the operation input device 2008 or a display device 2009, etc. Examples of the I/O interface 2005 include a USB (Universal Serial Bus) terminal, a DVI (Digital Visual Interface) terminal, an HDMI (High-Definition Multimedia Interface) R terminal, various processing circuits, and the like.

The operation input device 2008 functions as, for example, an input unit that receives a client's operation on the electronic device 2000, and is connected to the I/O interface 2008 inside the electronic device 2000.

The display device 2009 outputs a recognition result to the client, is equipped on the electronic device 2000, and is connected with the I/O interface 2005 inside the electronic device 2000. The display device 2009 may be, for example, a liquid crystal display, an organic electro-luminescence display and the like.

In addition, the I/O interface 2005 may be connected to an external device such as an operation input device (e.g., a keyboard or a mouse) or an external display device external to the electronic device 2000. The I/O interface 2005 may be connected to a drive (not shown). The drive is a reader/writer for removable recording media such as magnetic disks, optical disks, semiconductor memories and the like, either internal or external to the electronic device 2000. The drive reads information recorded in the equipped removable recording medium and outputs the same to the RAM 2003. Also, the drive is capable of writing records into the equipped removable recording medium.

The communication interface 2006 functions as a communication unit for wireless or wired communication with a device external to the electronic device 2000. The communication interface 2006 may obtain relevant data used in the above-described method of the present disclosure, such as generic face landmarks and the like, through the Internet. Examples of the communication interface 2006 include a communication antenna and an RF (Radio Frequency) circuit (wireless communication), an IEEE 802.15.1 port and a transceiver circuit (wireless communication), an IEEE 802.11 port and a transceiver circuit (wireless communication), or a LAN (Local Area Network) terminal and a transceiver circuit (wired communication).

The iToF sensor 2007 functions as a means for acquiring iToF image data of a human face according to the present disclosure.

An example of the hardware configuration of the electronic device 2000 is described above. Note that the hardware configuration of the electronic device 2000 is not limited to the configuration shown in FIG. 20. Specifically, each of the above-described elements may be constituted by general-purpose components or may be constituted by specialized hardware for realizing the functions of each element. The above-described configuration may vary as appropriate according to the technical level at the time of implementation.

(1) A face deformation compensating method, comprising:

creating a generic face deformation map, the generic face deformation map including a generic face landmark data;

obtaining a user face image; and applying the generic face deformation map to the user face image, including:

morphing the generic face deformation map using the generic face landmark data and a user face landmark data; and compensating depth information in the user face image by using the morphed generic face deformation map so as to correct a face deformation of the user face image.

(2)

The method described in (1) above, wherein the generic face deformation map is created by obtaining an iToF data of a face sample;

extracting a GT data of the face sample;

aligning the GT data with the iToF data, to compute a first depth difference image representing a difference on depth information between the GT data and the iToF data;

detecting and extracting a sample face landmark data of the face sample;

matching the first depth difference image with the sample face landmark data to obtain a second depth difference image, the second depth difference image having the sample face landmark data as marks;

obtaining the generic face landmark data;

based on the generic face landmark data and using the sample face landmark data marked in the second depth difference image, morphing the second depth difference image to obtain a third depth difference image, as the generic face deformation map, which is matched and marked with the generic face landmark data.

(3)

The method described in (2) above, wherein computing the first depth difference image comprises:

converting point clouds of the iToF data into a mesh;

aligning the GT data with the mesh;

projecting the GT data and the mesh aligned to obtain a projected image of the GT data and a projected image of the iToF data; and computing the first depth difference image based on the projected images of the GT data and the iToF data.

(4)

The method described in (2) above, wherein computing the first depth difference image comprises:

directly projecting the GT data by using camera intrinsics, to obtain a projected image of the GT data;

projecting point clouds of the iToF data to obtain a projected image of the iToF data; and computing the first depth difference image based on the projected images of the GT data and the iToF data.

(5)

The method described in (4) above, further comprises:

determining whether the projected images of the GT data has been aligned with an image of the face sample.

(6)

The method described in any of (2) to (5) above, wherein applying the generic face deformation map comprises:

detecting and extracting the user face landmark data from the user face image;

morphing the generic face deformation map to match the generic face landmark data marked in the generic face deformation map with the detected user face landmark data, so as to obtain a fourth depth difference image; and based on the fourth depth difference image, compensating the depth information of the user face image.

(7)

The method described in any of (2) to (5) above, wherein creating the generic face deformation map further comprises:

obtaining capturing parameters of the iToF data of the face sample;

repeating the step of generating the third depth difference image while changing values of the capturing parameters; and constructing the generic face deformation map by using a plurality of the third depth difference images generated based on a plurality of groups of the values of the capturing parameters.

(8)

The method described in (7) above, wherein applying the generic face deformation map comprises:

obtaining the capturing parameters of the user face image, and interpolating the capturing parameters of the user face image into the generic face deformation map, to obtain a fifth depth difference image marked with the generic face landmark data and corresponding to the capturing parameters of the user face image;

detecting and extracting the user face landmark data from the user face image;

morphing the fifth depth difference image to match the generic face landmark data marked in the fifth depth difference image with the detected user face landmark data, so as to obtain a sixth depth difference image; and based on the sixth depth difference image, compensating the depth information of the user face image.

(9)

The method described in (7) above, wherein the capturing parameters comprises an angle between a gaze direction of a face and camera, and a distance between the camera and the face.

(10)

The method described in (9) above, wherein the angle comprises yaw and pitch.

(11)

The method described in any of (2) to (5) above, wherein creating the generic face deformation map further comprises:

obtaining capturing parameters of the iToF data of the face sample;

repeating the step of generating the third depth difference image while changing values of the capturing parameters; and generating a plurality of the third depth difference images as sample images based on a plurality of groups of the values of the capturing parameters, and wherein the face sample is a random face sample, and creating the generic face deformation map further comprises:

generating multiple sets of the sample images for a plurality of the face samples, and computing average values of the multiple sets of the sample images for each group of the values of the capturing parameters, thereby generating the generic face deformation map composed of multiple average third depth difference images.

(12)

The method described in (11) above, wherein applying the generic face deformation map comprises:

obtaining the capturing parameters of the user face image, and interpolating the capturing parameters of the user face image into the generic face deformation map, to obtain a fifth depth difference image marked with the generic face landmark data and corresponding to the capturing parameters of the user face image;

detecting and extracting the user face landmark data from the user face image;

morphing the fifth depth difference image to match the generic face landmark data marked in the fifth depth difference image with the detected user face landmark data, so as to obtain a sixth depth difference image; and based on the sixth depth difference image, compensating the depth information of the user face image.

(13)

An imaging device, comprising:

an imaging unit, configured to capture a user face image;

a memory unit, in which a generic face deformation map including a generic face landmark data is stored, wherein the generic face deformation map is generated according to the method described in any one of (7) and (9)-(11) above; and a processing unit, configured to:

detect and extract user face landmark data from the user face image; and morph the generic face deformation map using the generic face landmark data and the user face landmark data; and compensate the depth information in the user face image by using the morphed generic face deformation map, so as to correct a face deformation of the user face image.

(14)

The imaging device described in (13) above, wherein the processing unit is configured to:

obtaining capturing parameters of the user face image and interpolating the same into the generic face deformation map, to obtain a depth difference image for compensation marked with the generic face landmark data;

morphing the depth difference image for compensation using the generic face landmark data marked in the depth difference image for compensation based on the user face landmark data; and compensating depth information in the user face image based on the morphed depth difference image for compensation.

(15)

A storage medium on which a computer readable program is recorded, the program when executed on a processor performing the method described in any one of (1) to (12) above.

Although the compensating method, the imaging device and the storage medium according to the present disclosure have been described above with reference to the accompanying drawings, the present disclosure is not limited thereto, and it will be understood by those skilled in the art that various changes, combinations, sub-combinations, and modifications may be made without departing from the spirit or scope of the present disclosure as defined in the appended claims.

The invention claimed is:

1. A face deformation compensating method, comprising:
creating a generic face deformation map by:
   obtaining indirect Time-of-Flight (iToF) data of a face sample;
   extracting ground truth (GT) data of the face sample;
   aligning the GT data with the iToF data, to compute a first depth difference image representing a difference on depth information between the GT data and the iToF data;
   detecting and extracting a sample face landmark data of the face sample;
   matching the first depth difference image with the sample face landmark data to obtain a second depth difference image, the second depth difference image having the sample face landmark data as marks;
   obtaining generic face landmark data; and
   based on the generic face landmark data and using the sample face landmark data marked in the second depth difference image, morphing the second depth difference image to create a third depth difference image which is the generic face deformation map and is matched and marked with the generic face landmark data;
obtaining a user face image;
detecting and extracting user face landmark data from the user face image; and
applying the generic face deformation map to the user face image, by:
   morphing the generic face deformation map using the generic face landmark data and the user face landmark data; and
   compensating depth information in the user face image by using the morphed generic face deformation map so as to correct a face deformation of the user face image.

2. The method of claim 1, wherein computing the first depth difference image comprises:
converting point clouds of the iToF data into a mesh;
aligning the GT data with the mesh;
projecting the GT data and the mesh aligned to obtain a projected image of the GT data and a projected image of the iToF data; and
computing the first depth difference image based on the projected images of the GT data and the iToF data.

3. The method of claim 1, wherein computing the first depth difference image comprises:
directly projecting the GT data, by using camera intrinsics, to obtain a projected image of the GT data;
projecting point clouds of the iToF data to obtain a projected image of the iToF data; and
computing the first depth difference image based on the projected images of the GT data and the iToF data.

4. The method of claim 3, further comprising:
determining whether the projected image of the GT data has been aligned with an image of the face sample.

5. The method of claim 1, wherein the applying the generic face deformation map further comprises:
detecting and extracting the user face landmark data from the user face image;
morphing the generic face deformation map to match the generic face landmark data marked in the generic face deformation map with the detected user face landmark data, so as to obtain a fourth depth difference image; and
based on the fourth depth difference image, compensating the depth information of the user face image.

6. The method of claim 1, wherein creating the generic face deformation map further comprises:
obtaining capturing parameters of the iToF data of the face sample;
repeating the creating the third depth difference image while changing values of the capturing parameters; and
constructing the generic face deformation map by using a plurality of third depth difference images created based on a plurality of groups of the values of the capturing parameters.

7. The method of claim 6, wherein the applying the generic face deformation map further comprises:
obtaining the capturing parameters of the user face image, and interpolating the capturing parameters of the user face image into the generic face deformation map, to obtain a fifth depth difference image marked with the generic face landmark data and corresponding to the capturing parameters of the user face image;
detecting and extracting the user face landmark data from the user face image;
morphing the fifth depth difference image to match the generic face landmark data marked in the fifth depth difference image with the detected user face landmark data, so as to obtain a sixth depth difference image; and
based on the sixth depth difference image, compensating the depth information of the user face image.

8. The method of claim 6, wherein the capturing parameters comprise an angle between a gaze direction of a face and camera, and a distance between the camera and the face.

9. The method of claim 8, wherein the angle comprises yaw and pitch.

10. The method of claim 1, wherein the creating the generic face deformation map further comprises:
obtaining capturing parameters of the iToF data of the face sample;
repeating the creating the third depth difference image while changing values of the capturing parameters;
generating a plurality of the third depth difference images as sample images based on a plurality of groups of the values of the capturing parameters, wherein the face sample is a random face sample;
generating multiple sets of the sample images for a plurality of the face samples, and
computing average values of the multiple sets of the sample images for each group of the values of the capturing parameters, thereby generating the generic face deformation map composed of multiple average third depth difference images.

11. The method of claim 10, wherein the applying the generic face deformation map further comprises:

obtaining the capturing parameters of the user face image, and interpolating the capturing parameters of the user face image into the generic face deformation map, to obtain a fifth depth difference image marked with the generic face landmark data and corresponding to the capturing parameters of the user face image;

detecting and extracting the user face landmark data from the user face image;

morphing the fifth depth difference image to match the generic face landmark data marked in the fifth depth difference image with the detected user face landmark data, so as to obtain a sixth depth difference image; and based on the sixth depth difference image, compensating the depth information of the user face image.

12. An imaging device, comprising:

a camera to capture a user face image;

a memory which stores a generic face deformation map including a generic face landmark data; and processing circuitry configured to:

create the generic face deformation map by:

obtaining indirect Time-of-Flight (iToF) data of a face sample;

extracting ground truth (GT) data of the face sample;

aligning the GT data with the iToF data, to compute a first depth difference image representing a difference on depth information between the GT data and the iToF data;

detecting and extracting a sample face landmark data of the face sample;

matching the first depth difference image with the sample face landmark data to obtain a second depth difference image, the second depth difference image having the sample face landmark data as marks;

obtaining generic face landmark data; and based on the generic face landmark data and using the sample face landmark data marked in the second depth difference image, morphing the second depth difference image to create a third depth difference image which is the generic face deformation map and is matched and marked with the generic face landmark data;

obtain the user face image captured by the camera;

detect and extract user face landmark data from the user face image; and apply the generic face deformation map to the user face image, by:

morphing the generic face deformation map using the generic face landmark data and the user face landmark data; and compensating depth information in the user face image by using the morphed generic face deformation map so as to correct a face deformation of the user face image.

13. The imaging device of claim 12, wherein the processing circuitry is further configured to:

obtain capturing parameters of the user face image and interpolate the capturing parameters of the user face image into the generic face deformation map, to obtain a depth difference image for compensation marked with the generic face landmark data;

morph the depth difference image for compensation using the generic face landmark data marked in the depth difference image for compensation based on the user face landmark data; and compensate depth information in the user face image based on the morphed depth difference image for compensation.

14. A non-transitory storage medium on which a computer readable program is recorded, the program when executed on a processor causes the processor to perform a process comprising:

creating a generic face deformation map by:

obtaining indirect Time-of-Flight (iToF) data of a face sample;

extracting ground truth (GT) data of the face sample;

aligning the GT data with the iToF data, to compute a first depth difference image representing a difference on depth information between the GT data and the iToF data;

detecting and extracting a sample face landmark data of the face sample;

matching the first depth difference image with the sample face landmark data to obtain a second depth difference image, the second depth difference image having the sample face landmark data as marks;

obtaining generic face landmark data; and based on the generic face landmark data and using the sample face landmark data marked in the second depth difference image, morphing the second depth difference image to create a third depth difference image which is the generic face deformation map and is matched and marked with the generic face landmark data;

obtaining a user face image;

detecting and extracting user face landmark data from the user face image; and applying the generic face deformation map to the user face image, by:

morphing the generic face deformation map using the generic face landmark data and the user face landmark data; and compensating depth information in the user face image by using the morphed generic face deformation map so as to correct a face deformation of the user face image.

15. The non-transitory storage medium of claim 14, wherein the computing the first depth difference image comprises:

converting point clouds of the iToF data into a mesh;

aligning the GT data with the mesh;

projecting the GT data and the mesh aligned to obtain a projected image of the GT data and a projected image of the iToF data; and computing the first depth difference image based on the projected images of the GT data and the iToF data.

16. The non-transitory storage medium of claim 14, wherein the computing the first depth difference image comprises:

directly projecting the GT data by using camera intrinsics, to obtain a projected image of the GT data;

projecting point clouds of the iToF data to obtain a projected image of the iToF data; and computing the first depth difference image based on the projected images of the GT data and the iToF data.

* * * * *